(12) United States Patent
Kerrebrock

(10) Patent No.: US 6,351,938 B1
(45) Date of Patent: *Mar. 5, 2002

(54) TURBINE OR SYSTEM WITH INTERNAL EVAPORATIVE BLADE COOLING

(76) Inventor: Jack L. Kerrebrock, 108 Tower Rd., Lincoln, MA (US) 01773

(*) Notice: Subject to any disclaimer, the term of this patent is extended or adjusted under 35 U.S.C. 154(b) by 0 days.

This patent is subject to a terminal disclaimer.

(21) Appl. No.: 09/594,898

(22) Filed: Jun. 15, 2000

Related U.S. Application Data

(63) Continuation-in-part of application No. 09/333,364, filed on Jun. 15, 1999, now Pat. No. 6,192,670.

(51) Int. Cl.$^7$ ................................................. F02C 3/00
(52) U.S. Cl. .................................................... 60/39.75
(58) Field of Search ................................ 60/39.512, 736, 60/39.75; 417/407

(56) References Cited

U.S. PATENT DOCUMENTS

| | | | |
|---|---|---|---|
| 2,667,326 A | 1/1954 | Ledinegg | 253/39.15 |
| 2,737,366 A | 3/1956 | Ledinegg | 253/39.15 |
| 2,744,723 A | 5/1956 | Roush | 253/39.15 |
| 2,812,157 A | 11/1957 | Turunen et al. | 253/39.15 |
| 2,849,210 A | 8/1958 | Turunen et al. | 253/39.15 |
| 2,952,441 A | 9/1960 | Jones | 253/39.15 |
| 3,738,771 A | 6/1973 | Delarbre et al. | 416/96 |
| 3,842,596 A | 10/1974 | Gray | 60/39.66 |
| 3,902,820 A | 9/1975 | Amos | 416/97 |
| 3,963,368 A | 6/1976 | Emmerson | 415/115 |
| 4,022,542 A | 5/1977 | Barbeau | 416/97 A |
| 4,118,145 A | 10/1978 | Stahl | 416/96 R |
| 4,179,240 A | 12/1979 | Kothmann | 416/96 R |
| 4,302,153 A | 11/1981 | Tubbs | 416/96 R |
| 4,314,794 A | 2/1982 | Holden et al. | 416/97 A |
| 4,330,235 A | 5/1982 | Araki | 416/96 R |
| 4,422,229 A | 12/1983 | Sadler et al. | 29/156.8 H |
| 4,437,810 A | 3/1984 | Pearce | 415/115 |
| 4,440,834 A | 4/1984 | Aubert et al. | 428/554 |
| 4,498,301 A | 2/1985 | Tsubouchi | 60/657 |
| 4,506,634 A | 3/1985 | Kerrebrock | 123/68 |
| 4,507,051 A | 3/1985 | Lesgourgues et al. | 416/97 R |
| 4,522,562 A | 6/1985 | Glowacki et al. | 416/95 |
| 4,529,358 A | 7/1985 | Papell | 416/97 A |
| 4,604,031 A | 8/1986 | Moss et al. | 416/97 R |
| 4,648,799 A | 3/1987 | Brown et al. | 416/95 |
| 4,668,162 A | 5/1987 | Cederwall et al. | 415/115 |
| 4,898,514 A | 2/1990 | McCracken | 416/95 |
| 5,299,418 A | 4/1994 | Kerrebrock | 60/39.75 |

OTHER PUBLICATIONS

U.S. application No. 09/333,364, filed Jun. 1999, pending.*

* cited by examiner

Primary Examiner—Timothy S. Thorpe
Assistant Examiner—William Rodriguez
(74) Attorney, Agent, or Firm—Thomas J. Engellenner; Michael I. Falkoff; Nutter McClennen & Fish LLP

(57) ABSTRACT

A radial flow engine has at least one rotor with an internal cavity that includes a vaporization section and a condensation section. The condensation section is disposed radially inward toward the shaft and the vaporization section extends radially outward adjacent to the surface of the rotor blade. The vaporization section includes a series of pockets for dispersing the cooling fluid within each blade, and a cascaded series of capture protrusions to distribute the liquid coolant to the successive radially-arrayed pockets. A working system includes a centrifugal compressor which feeds a compressed air fuel mixture to an annular combustion chamber that, in turn, feeds the combustion gases along a radial direction to impinge on the surface of the cooled radial flow rotor. Optionally, the system is a regenerative system including a heat exchange sub-assembly which couples heat from the exhaust stream to a position between the compressor and combustion chamber. The invention also includes a compressor, or a turbine, or both a compressor and a turbine with a rotor cooled by internal vaporization and condensation of a recirculating medium, and systems wherein such a cooled compressor and cooled turbine assembly operate together, either as a stand-alone engine or combustion system, or as a core engine between other input and output stages. The core engine may be retrofitted to improve the efficiency or increase the power of an existing plant.

9 Claims, 7 Drawing Sheets

TURBINE OR SYSTEM WITH INTERNAL EVAPORATIVE BLADE COOLING

CROSS-REFERENCE TO RELATED APPLICATIONS

This application is a continuation-in-part of U.S. patent application Ser. No. 09/333,364, which was filed on Jun. 15, 1999 now U.S. Pat. No. 6,192,670 and which is expressly incorporated by reference herein.

BACKGROUND OF THE INVENTION

This invention relates generally to the field of turbines and power systems. Fuel fired internal combustion engines such as gas turbine engines utilize a working fluid, namely an air/fuel mixture, which changes composition during combustion to drive the turbine with hot expanded gases. A conventional gas turbine engine includes a compressor, a combustion chamber and a turbine made up of an arrangement of stators and rotors. Each of the rotors includes blades and a supporting disk. Ideally, for the optimum extraction of energy, the combustion process should occur at about 4000° Fahrenheit. However, as a practical matter due to metallurgical concerns, the components of a turbine must operate at considerably lower temperatures. Cooling of the stationary housing and stators in combustion chamber walls is relatively straightforward by any of a number of means; however the rotors, due to their high rotational speed, present many problems for conventional cooling.

Various approaches have been proposed for utilizing internal fluid cooling to more effectively cool engine parts such as combustion chamber walls, turbine rotors and stators. In the case of rotor blades, some approaches have involved the internal use of a vaporizable cooling fluid that travels from the root of the rotor out through the tip of the rotor blade. Another approach has been to utilize a closed cycle cooling system in which a cooling fluid occupies only a portion of an internal cavity in the blade and circulates as a heat exchange medium. The physical properties of the cooling fluid are such that it is vaporized in certain regions of the cavity by virtue of the operating temperature prevailing in those regions during normal operation of the engine. U.S. Pat. No. 5,299,418 describes one particularly advantageous structure for closed circulation of a vaporizable liquid phase coolant within the cavity of a turbine blade. The improvement claimed in that patent involves a geometry for distributing coolant fairly uniformly over the inner surface of a blade in an axial-flow gas turbine so as to achieve a distributed cooling effect for the entire blade. Other constructions are claimed in U.S. Pat. Nos. 5,857,836 and 5,954,478.

While the '418 patent illustrates an axial flow turbine with its characteristic blade shape, other forms of turbine have different configurations and pose different challenges to implementing effective coolant circulation. For example, there exists a need for better cooling systems in the relatively common turbine architecture utilizing a centrifugal compressor with an annular combustion chamber to feed a radial flow turbine. Similarly, smaller turbines where a regenerative loop architecture is used to enhance heat efficiency of a radial flow turbine, present particular challenges.

In addition to cooling of the turbine rotors that reside in combustion gases, cooling of compressor rotors is also desirable. Since the blades of the compressor operate under essentially adiabatic conditions in the air or gas mixture passing through the compressor, and the gas temperature rises as it is compressed, the ability of the blade material to operate at elevated temperature sets an upper limit on the temperature ratio, hence also the pressure ratio, of the compression system.

The compressor discharge temperature of gas turbines with adiabatic compression is typically limited to approximately 1200° F. (920° K) by the strength of available materials at temperature. For isentropic (and adiabatic) compression this implies a pressure ratio of 50 if the inlet temperature is 300° K, and implies an ideal Brayton cycle efficiency of 0.67. Thus, there is considerable margin for improvement if the cycle pressure ratio, or the temperature ratio, can be raised. Moreover, operation of a compressor at elevated temperature lowers its efficiency, increasing the work required to achieve a given pressure ratio.

Accordingly, it is desirable to provide a system and construction for cooling the blades of a radial flow turbine so that the combustion process can be operated at higher temperatures without impairing the structural integrity of the turbine itself.

It is also desirable to provide a system and construction for cooling a rotor or blade assembly of a radial flow compressor to enhance its efficiency, permit use of less costly materials, or increase the pressure ratio for enhanced output.

In general, it is an object of the invention to provide an internal combustion engine wherein higher combustion temperatures or output power can be achieved while maintaining material temperatures at levels at least as low as those associated with known turbine engines and systems.

Another object of the invention is to provide an engine, having a radial flow centrifugal compressor, a combustion system and a radial flow turbine, that utilizes closed cycle evaporative cooling for the moving parts of the engine.

Still another object is to provide an improved rotor or rotor blade for use in a turbine or in a compressor of such a system.

SUMMARY OF THE INVENTION

One or more of the above desirable objects are achieved in accordance with the present invention by a system including, in a first aspect of the invention, a radial flow turbine having an arrangement of one or more stators and rotors in which each of the rotors defines an internal cavity that includes a vaporization section and a condensation section. The condensation section is disposed radially inward toward the shaft and the vaporization section extends over the rotor in thermal proximity to the blades. The vaporization section includes a series of pockets or passages for dispersing the cooling fluid proximate to heated surfaces of each blade, and a cascaded series of catchment channels or protruding shelves to distribute coolant to the pockets. A working turbine system includes a centrifugal compressor which feeds a compressed air/fuel mixture to an annular combustion chamber that, in turn, provides hot gases along a radial direction to impinge on the surface of a radial flow rotor. Optionally, the system is a regenerative system including a heat exchange sub-assembly which couples heat from the exhaust stream to a position between the compressor and combustion chamber.

In accordance with another aspect of the invention, a system includes a compression stage wherein an arrangement of one or more rotors compresses a fluid, such as air or a fuel mixture. The internal structure of the rotors includes a cavity with vaporization and condensation sections that operate to lower peak rotor temperature and transfer heat to a conveniently cooled sink. The vaporization section may include internally arranged shelves, lips or ledges that are arranged such that a coolant or phase change material cascades between successive catchment shelves, or is otherwise obstructed and channeled so as to distribute the coolant material effectively over the rotor interior and apply heat from the compressor blades to vaporize the coolant. This in turn drives a return flow or coolant circulation cycle in which heat is carried to a condensation region, lowering rotor operating temperature. The compressor may be a centrifugal compressor, such as a radial compressor that feeds a compressed fuel-air mixture to an annular combustion chamber for driving a radial-flow turbine, or it may be an axial flow compressor. In a turbine-driven power system, both the compressor and the turbine rotors may be cooled by internal evaporation, allowing enhancement of operating efficiency, power output and materials. Fully-cooled turbines may thus be manufactured at low cost, at any level of size or complexity, using low density high strength materials such as aluminum alloy that are otherwise inappropriate for conventional turbine or compressor operating temperatures.

In a further embodiment, the compressor, the turbine or both the compressor and turbine, of the present invention can be retrofitted between a compressor and a turbine of an existing axial-flow turbine power plant to enhance power or operating efficiency, essentially interfitting a high pressure, high temperature core engine in an otherwise conventional gas turbine system.

BRIEF DESCRIPTION OF THE DRAWINGS

These and other features of the invention will be understood from the description below taken in conjunction with the accompanying drawings, wherein.

DETAILED DESCRIPTION OF THE INVENTION

In the prior art there have been many proposals to cool turbine blades by providing a vaporizable liquid in a hollow chamber formed in each blade. Recently, applicant has proposed in U.S. Pat. No. 5,299,418 an arrangement whereby such a phase change coolant evaporates and condenses within the blade of an axial flow turbine. In the device of that patent, coolant circulation is controlled by a plurality of transverse ridges or capture shelves which cause the cooling fluid to cascade outwardly in the centrifugal field and be distributed at successive radial levels extending along the inner surface of the blade.

Figure 1:
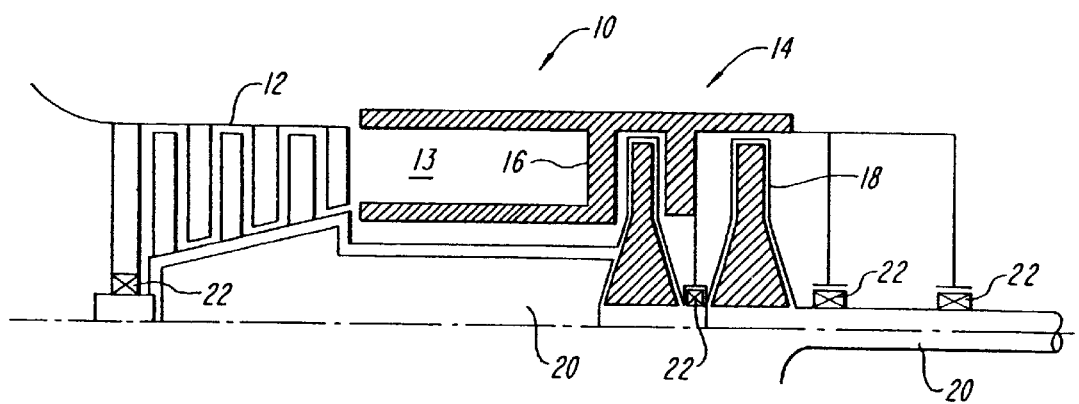
FIG. 1 is a schematic diagram of an axial flow gas turbine of the prior art.
Figure 2:
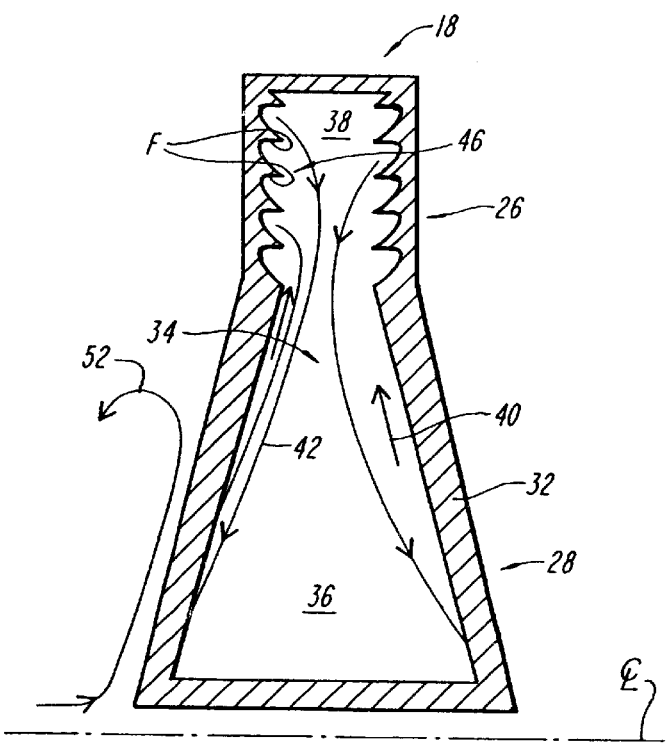
FIG. 2 is a schematic diagram of a prior art evaporatively cooled blade for the turbine of FIG. 1.

FIGS. 1 and 2 illustrate an axial flow turbine system and the cooled blades of that U.S. Pat. No. 5,299,418, which is hereby incorporated herein in its entirety. As shown therein, an engine 10 includes a compressor 12, a combustion chamber 13, and a turbine 14. The turbine 14 comprises an arrangement of stators 16 and rotors 18, with the rotors being connected to drive shafts 20 that are supported in bearings 22. Through rapid combustion, working fluid exiting the combustion chamber 13 performs work on the rotors 18 and causes them to drive the shafts 20. As best seen in FIG. 2, each of the rotors 18 of that prior art system includes an internal cooling system carried out by phase transition and circulation in a closed cycle of a cooling fluid within the blade. The liquid phase of the cooling fluid occupies a portion only of an internal cavity provided in the rotor.

This internal cavity is more clearly shown in FIG. 2, which is a cross-section of a representative rotor 18. The rotor 18 is formed with a wall 32 that encloses an internal cavity 34. The internal cavity 34 is divided into a condensing section 36 located along a radially inward section at the rotor disk 28, and a vaporization section 38 located more outwardly to effect heat transfer at the rotor blade 26. Typically multiple rotor blades 26 are supported by the rotor disk 28.

Cooling fluid F is contained within the internal cavity 34 and receives heat from the wall 32 at the vaporization section 38 which resides in the flow of combustion gases of the engine working fluid. The physical properties of the cooling fluid are such that it vaporizes at the temperatures experienced in the vaporization section 38 during normal operation of the rotor 18. Various liquid metals such as sodium, potassium or a mixture of these are suitable for use as the cooling fluid F. Other appropriate cooling fluids will be apparent to those skilled in the art.

The geometry and operation of the axial flow turbine of FIGS. 1 and 2 results in a flow of the cooling fluid F in liquid phase in the direction of the arrows 40 to the vaporization section 38, and the flowing cooling fluid is distributed over the internal surface of the wall 32 by the array of protruding ridges or lips 46 which are arranged so that the cooling fluid cascades from one ridge radially outward to the next ridge while some fluid is evaporated at each ridge and thereby removes heat from the area of the wall 32 locally in that region. The vaporized fluid filling the section 38 experiences a radially inward flow as vapor in the direction of arrows 42 to the condensing section 36, where it re-liquefies to again circulate outward and effect further cooling. Return of the vapor is effected by a pumping action generated by the difference in vapor pressures in the vaporization and condensing sections of the rotor 18. Thus, the overall operation involves a cooling liquid washing radially outward over a ridge plate. As further described in U.S. Pat. Nos. 5,857,836 and 5,954,478, various baffles, permeable structures or flow barriers may be provided to suitably slow down or modulate the distribution of coolant against the extreme centrifugal forces at play in the spinning rotor.

The present invention is directed to implementation of a cooling structure for a different form of turbine, in which the blades take a different geometry, namely that of a radial flow turbine, illustrated in FIGS. 3–5A below. In a further aspect the invention contemplates a compressor rotor cooled by internal evaporative cooling, and various systems utilizing such compressor cooling to enhance the efficiency or power of an engine, or to allow turbine or combustion system construction with low cost alloys.

Figure 3:
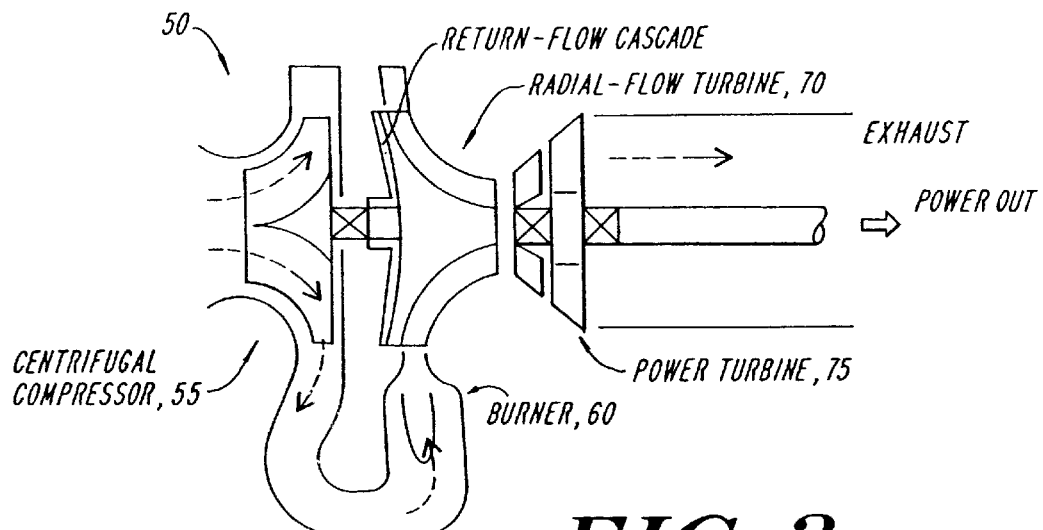
FIG. 3 illustrates a radial flow turbine and centrifugal compressor suitable for the practice of the present invention.

FIG. 3 illustrates a basic radial flow turbine system 50, in which a centrifugal compressor 55 having evaporatively cooled blades provides a flow of working fluid to a combustion chamber 60 disposed circumferentially about the radially outer periphery of a turbine 70, and wherein the turbine 70 likewise has evaporatively cooled blades disposed for movement in a radially-directed flow of the hot combustion gases. As shown, the heated gas may then be provided to a second stage power turbine 75, that may be driven by either radial or axial flow.

Figure 4:
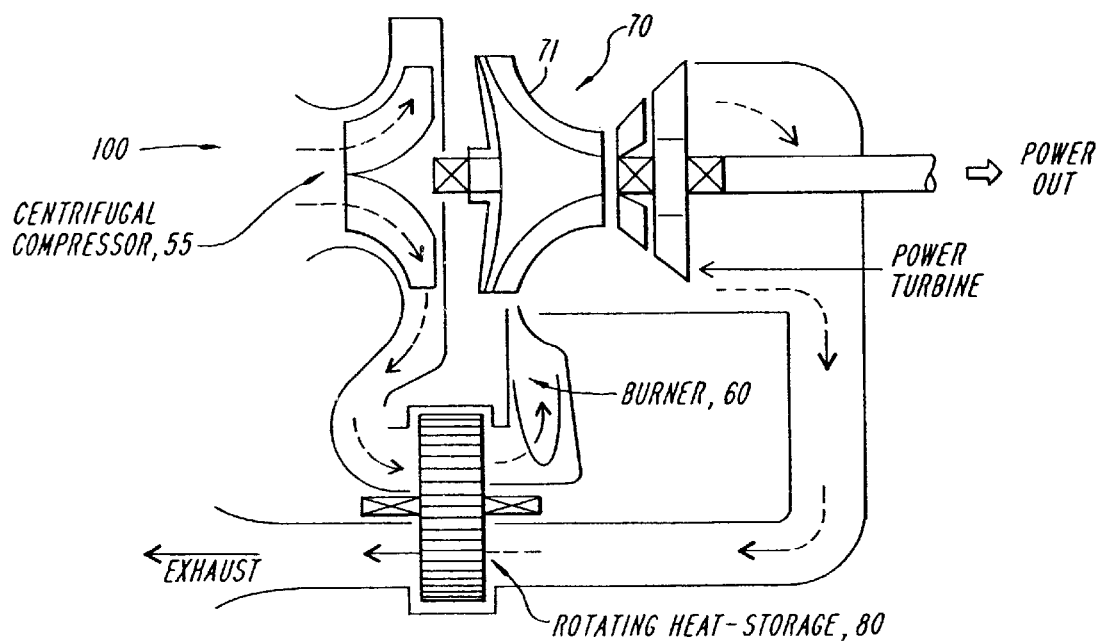
FIG. 4 illustrates a regenerative radial flow gas turbine suitable for the practice of the present invention.

FIG. 4 illustrates another evaporatively cooled system 100 also employing a centrifugal compressor 55 and a radial flow turbine 70. System 100 differs from the system 50 of FIG. 3 in having a heat exchange unit 80 shown as a rotating heat storage unit, at a position to preheat the working fluid or air exiting from the compressor with energy from the turbine output stream before the working fluid enters the combustion chamber 60. Such an architecture is common in smaller turbines where it is desired to increase the overall thermal efficiency. In both the system 50 of FIG. 3 and the system 100 of FIG. 4, the combustion gases pass in a radial direction to drive the turbine 70, impinging on the rotor and blade assembly 71.

Figure 5:
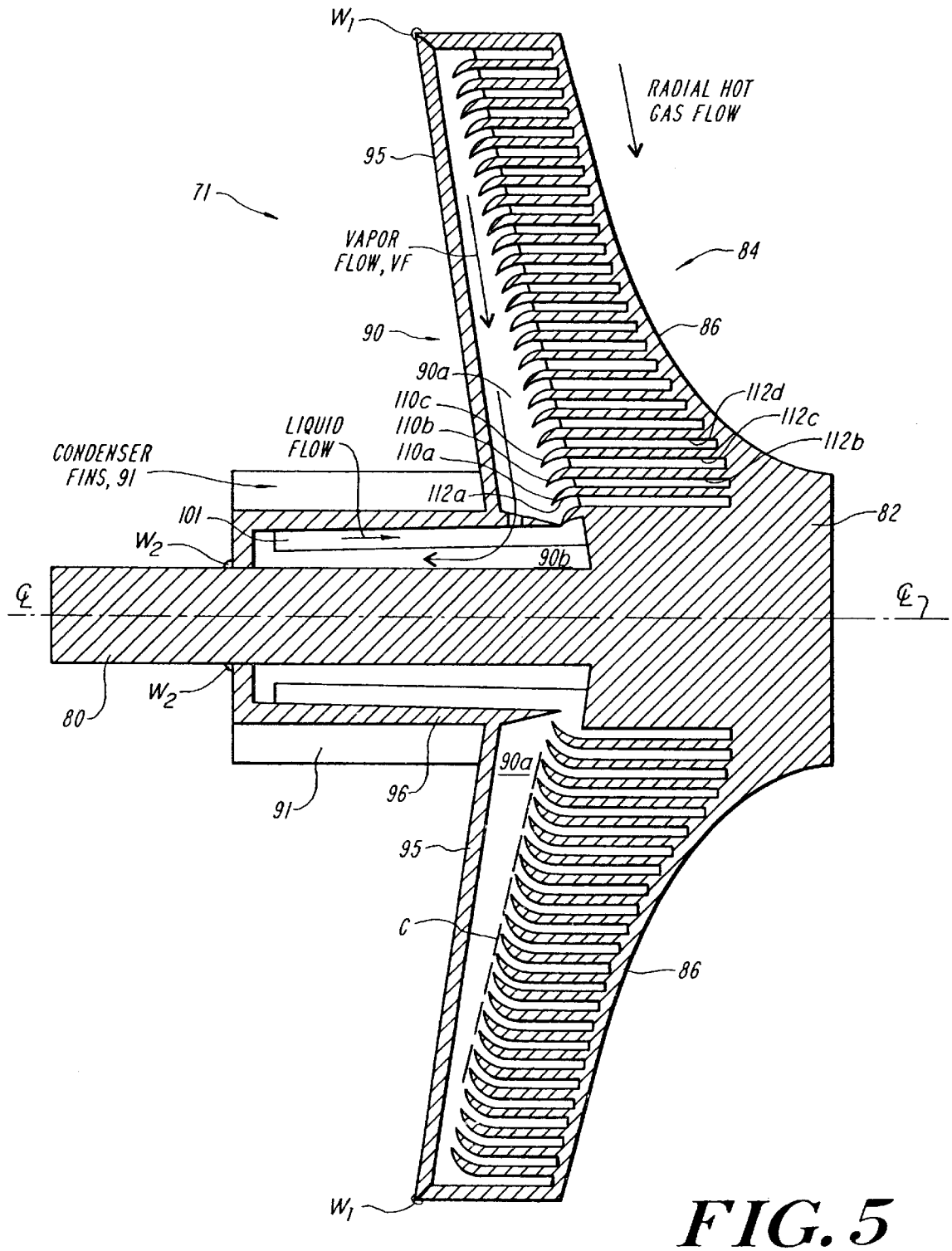
FIG. 5 shows a cross-section through a disk and radial flow turbine blade of the present invention for use in the systems of FIGS. 3 and 4.

In one embodiment of the present invention, the assembly 71 is configured such that the rotor assembly includes an internal chamber containing a vaporizable fluid and arranged for vaporization and condensation of the fluid to effectively cool the blades carried by the rotor and residing in the hot combustion gases. FIG. 5 illustrates an evaporatively cooled radial flow turbine blade element of the present invention in more detail.

Figure 5A:
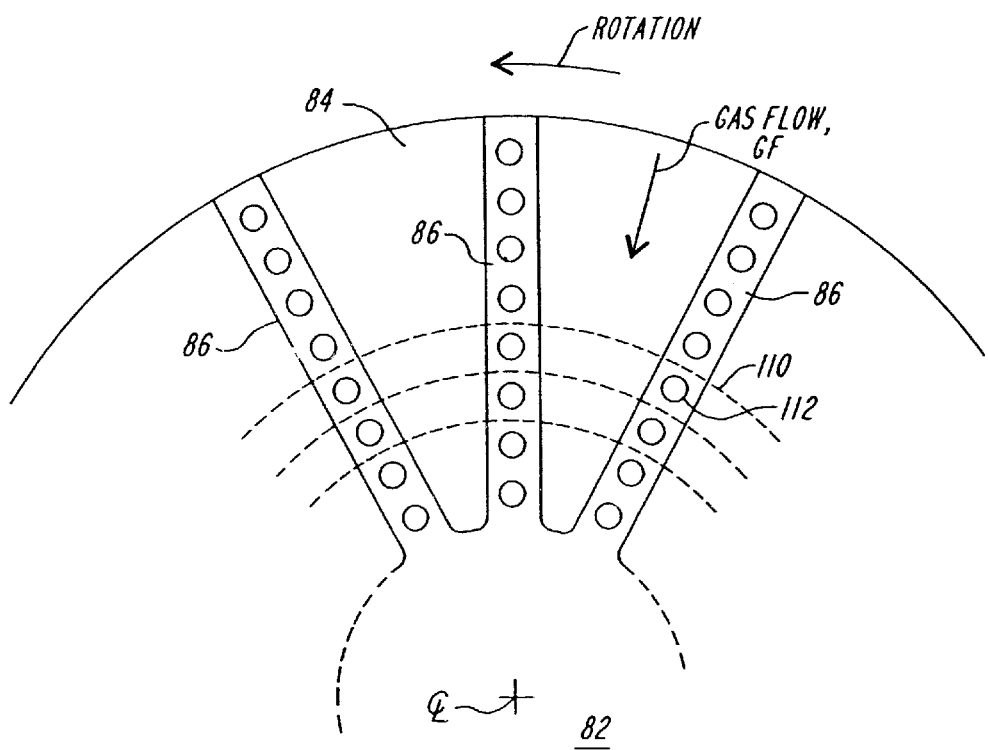
FIG. 5A shows a front plan view of the rotor of FIG. 5, illustrating blade placement and coolant channel alignment.

As shown in FIG. 5, the radial flow rotor assembly 71 comprises a generally central body portion including a shaft 80 and hub 82, with a disk 84 extending radially outward that carries the blades 86. As shown in FIG. 5A, a plan view facing directly along the axis of rotation, the disk 84 carries a plurality of blades 86 which extend from the center outwardly toward the periphery and are arrayed in a regular arrangement configured for catching the hot gas stream and driving the rotor. The direction of gas flow is indicated by the arrow GF, which as shown extends along a generally radial direction. FIG. 5 shows a plane section extending through the rotor 71 in a plane containing the axis and passing centrally through a pair of the blades 86. As shown therein, the rotor is constructed with an internal chamber 90 which is partially filled with a vaporizable heat exchange cooling material such as a metal of moderate vapor point as described above. The chamber 90 includes a vaporization section 90a and a condensation section 90b. The vaporization section 90a extends radially outward along the body of the disk in the region spanned by the blades 86. The condensation section 90b lies radially inward of the vaporization section 90a, and close to the shaft 80. The outer wall of the condensation section 90b may include condensor fins 91 which may, for example, ride in a stream of cooling air supplied to that region of the backside of the disk. Other forms of cooling for the shaft or central hub region may also be used to remove heat from the condensor housing, such as the provision of a circulating coolant through internal passages in the shaft or contiguous bearing or housing structures, with appropriate seals.

As further shown in FIG. 5, circulation of the heat exchange fluid within the chamber 90 proceeds by passage of liquid from the condensation chamber 90b through a liquid transfer viaduct such as a trough, or a drilling, passage or small aperture 101 which may be angled slightly as shown to direct the condensed fluid into the chamber 90a where it is driven centrifugally outward and captured by an overhanging capture lip 110a. The lip, while illustrated in cross-section, will be understood to preferably extend substantially uniformly at a radially constant distance circumferentially around the entire front wall of the chamber 90a. It thus forms a circumferential surface channel or trough, so that as the rotor 71 rotates, the cooling fluid is urged against the slightly dished shelf at constant radial distance and distributed uniformly along the length of the first capture lip 110a.

Extending from the shelf and at the same radial distance, is a recess 112 a which extends forwardly into the body of the turbine blade 86, so as to distribute the liquid from the shelf 110a along a penetrating passage into the blade 86 and extending close to its side and front surfaces 86 a which are heated by the gas flow. As further shown in FIG. 5, a plurality of similar capture lips 110b, 110c, 110d . . . are positioned at successively greater radial distances from the center or axis of rotation. These successive lips each lie along an incline cone angle indicated by dashed line C, and are positioned such that each extends slightly past the previous one, so that excess fluid driven against the shelf 110a overflows radially outward and is captured by the next shelf 110b, and then successively cascades so that liquid is captured by each of the successive shelves and is distributed to the interior of the blade along a corresponding successive set of recesses or drillings 112b, 112c, 112d . . . The radially outer edge of each of these distribution apertures 112 extends at the level of the surface of the corresponding shelf 110 to receive liquid coolant therefrom. A similar set of drillings 112a, 112b . . . is formed in each blade of the rotor.

FIG. 5A illustrates the general configuration of the penetrating coolant distribution recesses or pockets 112. These may be formed by drilling in from the front face of the blade, i.e., from the right as shown in FIG. 5, to the depth of the shelf 110, then plugging and welding closed the surface of each hole so made in the face of the blade. In a typical manufacturing process, the front, blade-carrying portion of the rotor may be machined as one piece, and the internal chamber structure may then be completed by assembling that piece to a second disk structure consisting of the back wall 95 and central condenser elements 91, 96, 101. Such assembly is illustrated in FIG. 5 by the perimeter welds $W_1$ and $W_2$ closing the two-piece assembly into a structure with an internal chamber arranged for the vaporization, return, condensation and distribution of material in an ordered and highly uniform manner.

In operation, the liquid entering each recess 112 cools the corresponding local region of the rotor blade 86, and is heated so that it vaporizes and fills the vaporization chamber 90a. This results in a flow of the less dense vapor centrifugally inward along a direction of vapor flow indicated by arrow VF. The returning vapor enters the cooler condensing chamber 90 b, where it condenses and is again driven by centrifugal force outwardly to the cascaded radial sequence of capture lips 110 for depth dispersion from the shelves into the penetrating pockets 112 to enhance cooling of the blade surfaces. The flow of vapor along the return direction VF is driven in part by the vapor pressure gradient directed toward the cooler region of the condensation chamber 90b.

Thus, the sequence of arcuate capture shelves and penetrating pockets results in a centrifugal distribution of the coolant liquid to remove heat from the angled blade surfaces of the radial flow turbine rotor, while providing a self-sustaining circulation of condensing vapor away from the blades that efficiently cools the entire rotor.

This rotor construction may also be applied to a compressor rotor to cool the rotor and allow operation at higher pressure ratios, or otherwise extend the range, efficiency or architecture of the compressor and combustion systems utilizing the compressor. Thus, a centrifugal compressor as shown in FIG. 3 may employ such a rotor cooling arrangement.

Figure 6:
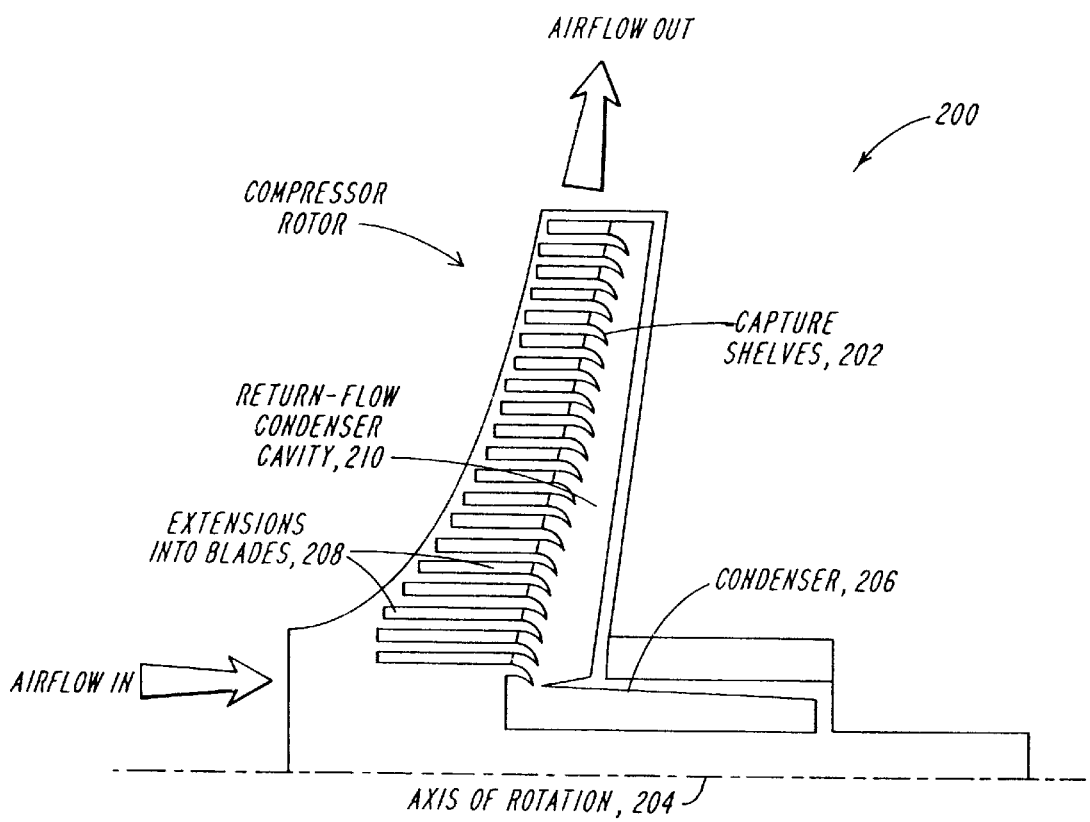
FIG. 6 shows a schematic section along a cooled compressor blade, through the rotor of a compressor embodiment of the invention.

As shown in FIG. 6, a vaporization cooled compressor 200 can be essentially a mirror image of the vaporization cooled turbine described in detail above. Its functional details are illustrated in FIG. 6, showing the return-flow cascade construction of the cooling system. It comprises a set of capture shelves 202, symmetric about the axis 204 of rotation of the compressor, and a condenser 206 located at a smaller radius from the axis of rotation than the capture shelves. The shelves and condenser form a cavity 210 which contains a vaporizable and condensable substance. The capture shelves are extended into the blades of the compressor rotor by holes or passages 208 that penetrate into the blade body substantially parallel to the axis of rotation, so that the cooling effects of the fluid are also extended into the blades. The condenser can be cooled by any of a number of means, such as air drawn from the compression system at a lower level of pressure than that delivered by the compressor under discussion, or a liquid cooling system, or any other that provides a suitable temperature and cooling capacity for removal of the heat transferred from the compressor blades.

The view of FIG. 6 is cross-sectional, taken along a centerline passing through the axis of rotation and midway through the thickness of one of the compressor blades. The capture shelves of the return flow cascade evaporative cooling system are arranged with circular symmetry about the axis of rotation, on the opposite surface of the wall of the disc that carries the compressor blades. As in the above-referenced U.S. patents and aforesaid patent application, all the liquid from the condenser, which is near the axis of rotation, enters the innermost shelf first. Some of it evaporates thence to cool the part of the compressor rotor adjacent that shelf, while the remainder spills or is channeled into the next outward shelf. This coolant cascade repeats so that the fluid supplies all the shelves. The vapor produced in the shelves passes inward through a cavity formed by a cover disc, to a condenser region near the axis of rotation. Condensing on the inner surface of the condenser, the fluid is then carried axially by a set of troughs, to the first capture shelf. These troughs are interrupted just ahead of the capture shelf by apertures that permit passage of the vapor into the condenser.

As with the turbine rotor embodiment, to ensure that the liquid cascades outward without bypassing any particular shelf, the disc surface is not plane and perpendicular to the axis of rotation, but instead is conical as indicated in FIG. 6, so that liquid leaving one shelf over its lip, 'falls' outward into the next shelf behind its lip. Since much of the heat transfer to the compressor rotor occurs on the blades, which extend axially from the disc, each blade is provided with a set of distribution pockets, or approximately axially directed drillings or holes, one connecting to each capture shelf in such a way that the radially outermost surface of the hole is at the same distance from the axis of rotation as the outermost surface of the shelf. Thus, under the very strong apparent gravity field of rotation, the liquid will run from the capture shelf into the hole, from which it evaporates, the vapor flowing through the open end of the drilling, into the rotor cavity and thence to the condenser. Thus the holes distribute the liquid coolant uniformly to the portions of the rotor heated by compression of the input gases.

It will be appreciated that cooling of both the compressor and the turbine by vaporization enables one to construct gas turbines of the type shown schematically in FIG. 3 above of materials that are desirable from the viewpoint of cost and manufacturability, but would generally be unsuitable at the high temperatures found in normal gas turbines. Aluminum alloys and other low density high strength materials are examples. Thus one class of applications is the construction of a low-cost fully cooled gas turbine, at any level of size or complexity. For example, aluminum alloy having a relatively low melting temperature, and corresponding ease of manufacture, may be used as a rotor material for manufacture of a turbine and a high pressure ratio compressor.

The invention also contemplates applications for the cooled turbines and cooled compressors of the present invention as high pressure, high temperature core engines in gas turbines that otherwise use conventional technology. In this case the vaporization cooled core engine, consisting of a radial compressor, combustion system and radial turbine, replaces the combustion system of the conventional gas turbine. By causing the heat input to the engine to occur at higher temperature and pressure, this leads to improved thermodynamic efficiency for the overall engine. FIG. 3 illustrates one such embodiment, wherein the cooled compressor and cooled turbine drive a low pressure turbine that may, for example, be a turbine in an existing plant.

Figure 7:
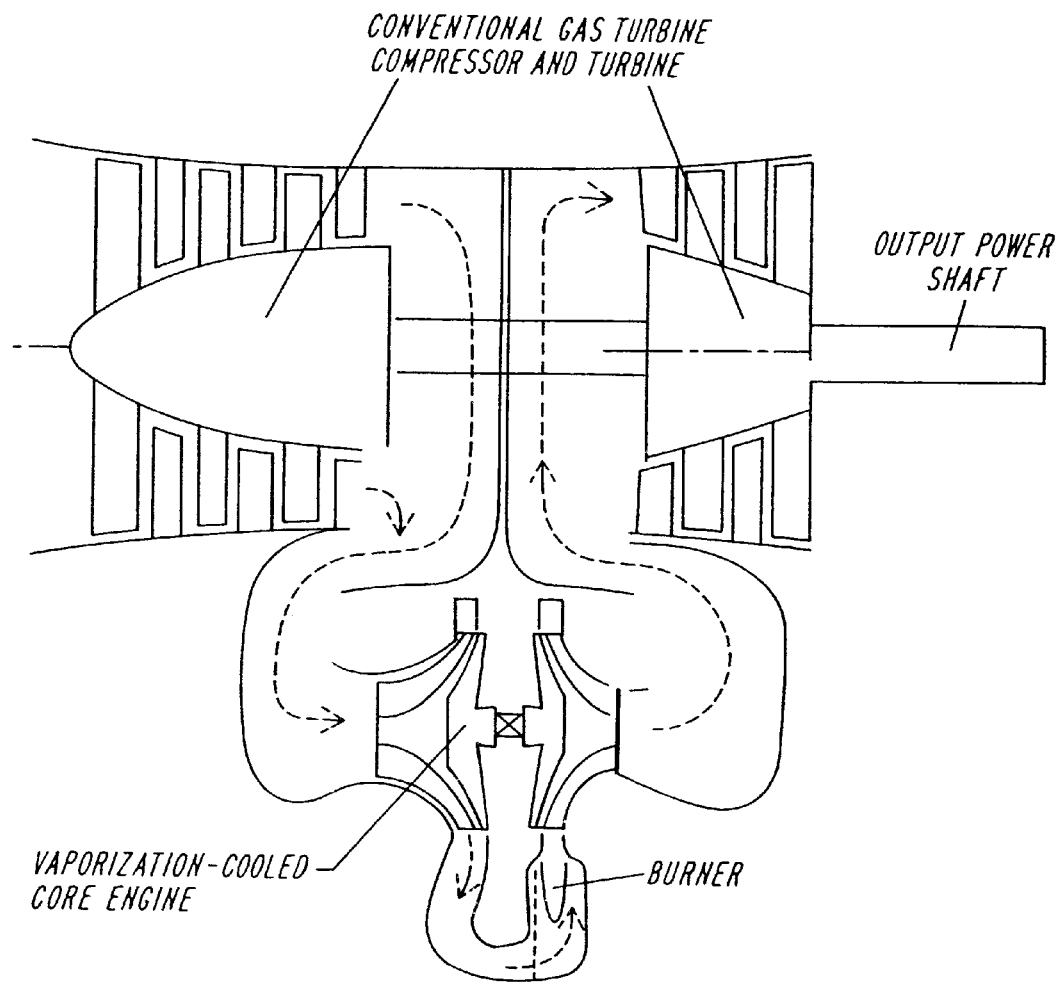
FIG. 7 illustrates a fully cooled core engine of the invention fitted or retrofitted to a system having convention units for low pressure compression and expansion.

In accordance with the present invention, this class of engine can also be implemented in, or applied to various power generation applications in, a number of ways. One that is especially attractive is shown schematically in FIG. 7. In this embodiment of a system, the core engine as described above having an internally cooled compressor, turbine or both, is set to the side of conventional gas turbine components that provide an initial low pressure compression and a final low pressure expansion stage. Thus, the cooled rotor assemblies added by the present invention do not rotate about the same axis as that of the conventional components. Instead, the compressor discharge air from the conventional or existing compressor is ducted to the compressor inlet of the core engine, and the exhaust from the core is then similarly ducted to the inlet of the conventional or existing turbine. This construction has the advantage of eliminating the complexity of multiple concentric rotating assemblies, and it allows the cooled rotor core engine of the invention to be retrofitted to an existing conventional engine, thus improving the power and efficiency of a low pressure axial flow plant or system.

The efficiencies and improvements attained with the enhanced performance compressor and turbine of the present invention can be quantified and more fully appreciated from the following discussion.

The efficiency of a typical, uncooled, compressor for a gas turbine is characterized by an adiabatic efficiency, defined in terms of the temperature and pressure ratios from inlet to outlet of the machine, as $$\eta_{ad} \equiv \frac{\left(\frac{p_2}{p_1}\right)^{\frac{\gamma-1}{\gamma}} - 1}{\frac{T_2}{T_1} - 1}$$

Since the flow through the compressor is very nearly adiabatic in practice, the temperature rise of the air measures the power input, and the ideal power input for isentropic compression is given by the numerator, in terms of the desired pressure ratio. For pressure and temperature ratios approaching unity, the adiabatic efficiency approaches a limit termed the polytropic efficiency and given by $$\eta_{pol} \equiv \frac{\gamma-1}{\gamma} \frac{d\ln p}{d\ln T_{pol}}$$

where the subscript on T now refers to the (limiting) adiabatic process.

The effect of cooling in accordance with the present invention can be understood by noting that the actual increment of temperature in a cooled compressor will be less than that of an adiabatic compressor, by the amount of the heat removed by cooling. Thus $$d\ln T = d\ln T_{pol} - \frac{dT_c}{T} = \frac{\gamma-1}{\gamma\eta_{pol}} d\ln p - \frac{dT_c}{T}$$

Integrating this expression between the limits of $T_1$ and $T_2$ and rearranging terms, the equation becomes $$\frac{T_2}{T_1}\left(\frac{p_1}{p_2}\right)^{\frac{\gamma-1}{\eta_{pol}}} = e^{-\int_{T_1}^{T_2} \frac{dT_c}{T}} \quad (1)$$

The efficiency of the cooled compressor can thus be defined as $$\eta_{cooled} \equiv \frac{Idealwork}{Actualwork} = \frac{\left(\frac{p_2}{p_1}\right)^{\frac{\gamma-1}{\gamma}} - 1}{\frac{T_2}{T_1} - 1 + \frac{1}{T_1}\int_{T_1}^{T_2} dT_c} \quad (2)$$

in which the last term in the denominator represents the energy flow into the sink or cooling system that does not appear as thermal energy in the compressor exhaust.

Eliminating the pressure ratio with equation (1) yields an expression for the cooled compressor efficiency in terms of the temperature ratio.

$$\eta_{cooled} = \frac{\left[\frac{T_2}{T_1}e^{\int_{T_1}^{T_2} \frac{dT_c}{T}}\right]^{\eta_{pol}} - 1}{\frac{T_2}{T_1} - 1 + \frac{1}{T_1}\int_{T_1}^{T_2} dT_c} \quad (3)$$

This equation represents the fundamental expression of the efficiency of the cooled compressor. The effects of fluid-mechanical inefficiencies are contained in $\eta_{pol}$ while the effects of the cooling are represented by the two integrals. To numerically estimate the effect of cooling on the compressor efficiency it is necessary to estimate the magnitude of the integrals in equation (3). This can be done by modeling the flow passage in the compressor as a circular tube of diameter d, with wall temperature Tw. Then the rate of temperature rise along the flow axis can be written as $$\frac{dT_c}{dx} = \frac{4}{d}(T - T_w)St$$

where St is the Stanton number, correlated to the Reynolds and Prandtl Numbers.

Assuming that the heat removed from the flow is proportional to the distance along the passage $$\frac{dx}{d} \approx \frac{dT}{T_2 - T_1}$$

so that $$dT_c \approx 4St(T - T_w)\frac{dT}{T_2 - T_1}$$

Thus, the integrals appearing in the expression for $\eta$ are:

$$I_1 \equiv \int_{T_1}^{T_2} \frac{dT_c}{T} = 4St\left(1 - \frac{T_w}{T_2 - T_1}\ln\frac{T_2}{T_1}\right)$$

$$I_2 \equiv \frac{1}{T_1}\int_{T_1}^{T_2} dT_c = 4St\left(\frac{1}{2}\left(\frac{T_2}{T_1}+1\right) - \frac{T_w}{T_1}\right)$$

Figure 8A:
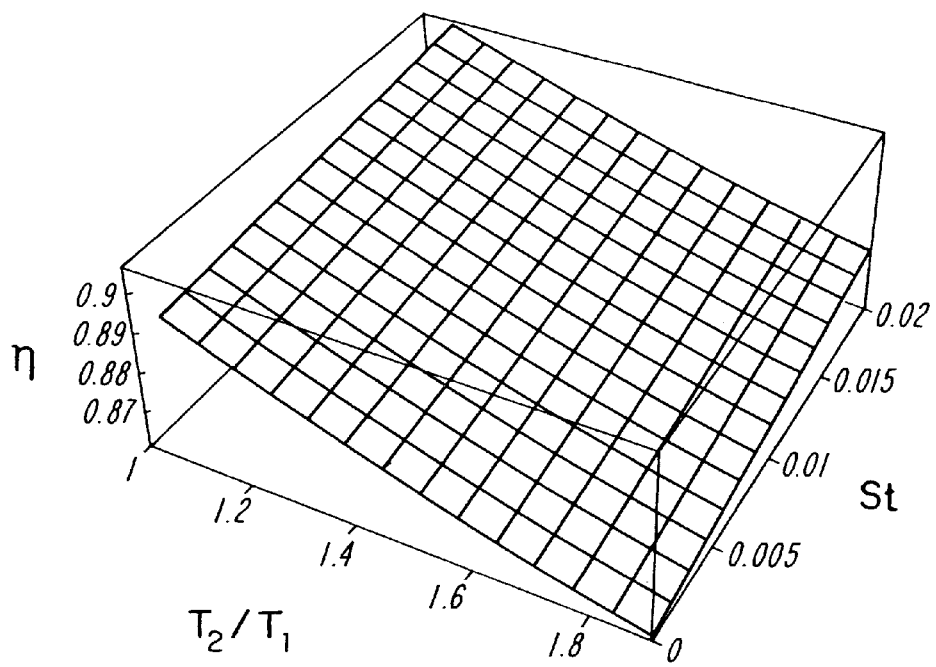
FIGS. 8A and 8B plot efficiency variation versus Stanton number with representative parameters.

The change in efficiency given by the model is shown in FIG. 8A as a function of compression temperature ratio and Stanton number, for a polytropic efficiency of 0.9. For a temperature ratio approaching unity the efficiency approaches the polytropic value of 0.9, as it should. For zero Stanton number, the efficiency equals the standard adiabatic efficiency for any given temperature ratio. For other values it can be seen that the efficiency increases with increasing Stanton number, that is, with increasing cooling.

Figure 8B:
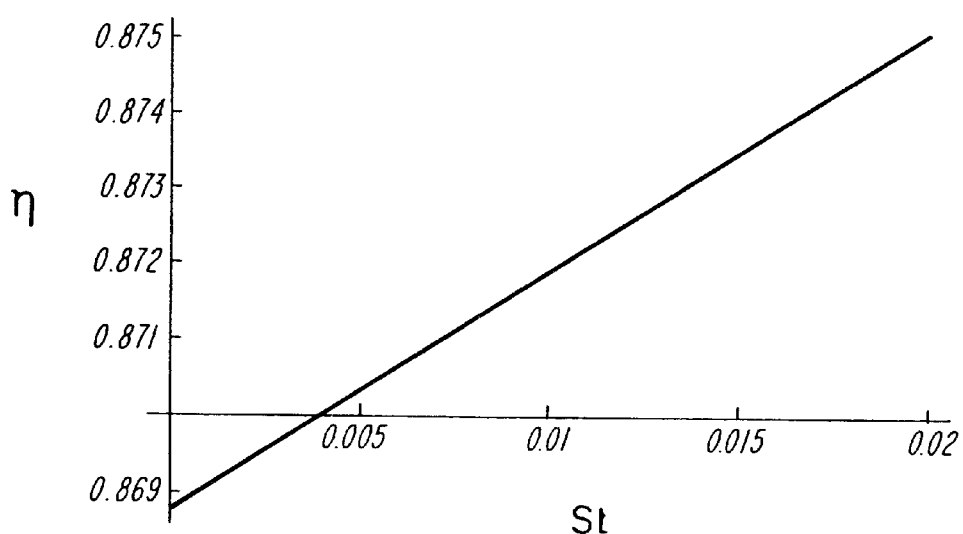

This latter variation is shown more clearly in FIG. 8B, depicted for a temperature ratio of 1.9. The efficiency increases from the adiabatic value of 0.868 at zero Stanton number to about 0.875 at a Stanton number of 0.02. While the difference of 0.007, or seven tenths of one per cent, may seem small, it is significant since the polytrophic efficiency is close to unity at 0.900. Thus, compressor cooling in accordance with the present invention increases compressor efficiency in addition to enabling higher gas temperature in the compressor.

The invention being thus disclosed and a representative embodiment described, further variations and modifications will occur to those skilled in the art, and all such variations and modifications are considered to be within the scope of the invention, as defined by the claims appended hereto and equivalents thereof.

What is claimed is:

1. A rotor assembly of a centrifugal compressor, wherein the rotor assembly includes a rotor body carrying a plurality of blades configured to rotate about an axis, and
   a closed coolant chamber in said body having a vaporization subchamber and a condensation subchamber, the vaporization subchamber extending radially outward from the condensation subchamber
   and being arranged so that
      i) liquid from said condensation chamber cascades into a radially arranged set of distribution shelves extending within said rotor behind the plurality of blades, and
      ii) each distribution shelf disperses said liquid to a pocket penetrating a blade
   so that the liquid is distributed within the blades to efficiently cool blade surfaces and remove heat transferred to the blades by compressed gas.

2. The rotor assembly of claim 1, wherein the rotor assembly is configured to compress a gas by for rotational movement of a plurality of blades at a first surface of the rotor assembly, and further comprising a plurality of capture shelves located on a back surface opposite said first surface, said capture shelves each extending at constant radius and being offset to capture liquid overflowing from a radially inward level as the assembly rotates, and a single condenser operative to receive and liquify vapors formed as heat is transferred form the blades to the liquid dispersed on the capture shelves, so that cooling liquid effectively circulates within the rotor assembly to reduce blade temperature.

3. The rotor assembly of claim 1, wherein the blades are disposed to compress a gas by rotational movement, and have a plurality of recesses penetrating a back surface of the blades, wherein the assembly further comprises a disk assembly joined to said blade assembly so as to form, together with said recesses said closed coolant chamber effective to provide internal evaporative cooling of the blades for removing heat transferred to the rotor assembly by compressed gas.

4. A gas turbine system comprising a centrifugal compressor, a combustion system and a radial flow turbine, wherein the compressor and the turbine each have rotor assemblies that are cooled by internal vaporization/condensation of a recirculating heat exchange medium.

5. The system of claim 4, wherein the rotor assembly of the centrifugal compressor is cooled by internal vaporization/condensation of a recirculating heat exchange medium that is distributed over a region of the rotor by a rank of capture shelves.

6. The system of claim 5, wherein the compressor rotor assembly comprises a cascade of capture shelves disposed within a compressor disc opposite the blades, each capture shelf having a circumferential lip at uniform distance from the axis of rotation and connecting passages extending into each blade, and a condenser near the axis of rotation.

7. A centrifugal compressor having a rotor assembly including rotor blades carried by a rotor and operative to compress a fluid such that the fluid heats up with increased pressure and transfers heat to the rotor, wherein the centrifugal compressor has a rotor cooled by internal vaporization/condensation of a recirculating heat exchange medium contained in the rotor so as to remove heat transferred to the rotor to maintain an enhanced operating temperature.

8. The centrifugal compressor of claim 7, wherein the recirculating heat exchange medium maintains a reduced operating temperature effective to enhance compressor efficiency.

9. The centrifugal compressor of claim 7, wherein the recirculating heat exchange medium reduces operating temperature during compressor operation at a pressure ratio above 25.

* * * * *